(12) United States Patent
Doty, II et al.

(10) Patent No.: US 6,898,186 B2
(45) Date of Patent: May 24, 2005

(54) MODEM PASS THROUGH FOR REMOTE TESTING

(75) Inventors: Jerry Dwight Doty, II, Dracut, MA (US); Luis Alexandre Viriato, Livermore, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 10/671,097

(22) Filed: Sep. 24, 2003

(65) Prior Publication Data

US 2004/0059773 A1 Mar. 25, 2004

Related U.S. Application Data

(63) Continuation of application No. 09/472,634, filed on Dec. 27, 1999, now Pat. No. 6,654,348.

(51) Int. Cl.[7] .................. H04L 12/28; H04L 12/66; G01R 31/08; H04J 3/16
(52) U.S. Cl. ............... 370/244; 370/352; 370/401; 370/466
(58) Field of Search .................. 370/230, 241, 370/242, 244, 276, 352, 389, 401, 466, 471, 474

(56) References Cited

U.S. PATENT DOCUMENTS

| | | | |
|---|---|---|---|
| 4,918,722 A | 4/1990 | Duehren et al. ............ 379/100 |
| 5,291,546 A | 3/1994 | Giler et al. ................. 379/100 |
| 5,369,686 A | 11/1994 | Dutra et al. ................. 379/94 |
| 5,488,651 A | 1/1996 | Giler et al. ................. 379/100 |
| 5,594,732 A | 1/1997 | Bell et al. .................. 370/401 |
| 5,659,542 A | 8/1997 | Bell et al. .................. 370/496 |
| 5,712,907 A | 1/1998 | Wegner et al. .............. 379/112 |
| 5,767,985 A | 6/1998 | Yamamoto et al. .......... 358/402 |
| 5,805,298 A | 9/1998 | Ho et al. .................... 358/402 |
| 5,812,278 A | 9/1998 | Toyoda et al. .............. 358/402 |
| 5,838,683 A | 11/1998 | Corley et al. ............... 370/408 |
| 5,838,915 A | 11/1998 | Klausmeier et al. ..... 395/200.45 |
| 5,838,994 A | 11/1998 | Valizadeh ................... 395/876 |
| 5,859,550 A | 1/1999 | Brandt ....................... 327/156 |
| 5,864,542 A | 1/1999 | Gupta et al. ................ 370/257 |
| 5,867,666 A | 2/1999 | Harvey ................. 395/200.68 |
| 6,084,956 A * | 7/2000 | Turner et al. ............... 379/230 |
| 6,151,628 A * | 11/2000 | Xu et al. .................... 709/225 |
| 6,373,838 B1 * | 4/2002 | Law et al. .................. 370/352 |

FOREIGN PATENT DOCUMENTS

WO          WO 97/18665          5/1997          ............ H04N/1/00

* cited by examiner

*Primary Examiner*—Duc Ho
(74) *Attorney, Agent, or Firm*—Marger Johnson & McCollom, P.C.

(57) ABSTRACT

A lab network access server is disclosed in accordance with an embodiment of the present invention. The lab network access server is coupled to a customer network server through a packet switching network. The customer modem device includes a customer modem device and is coupled to an end-user modem device employed by an end-user. In a diagnostic scenario, the end-user initiates a call through the customer network access server modem device, which is setup for pass through operations. The customer network access server, upon receiving the call information, routes the call information to the lab network access server for termination thereof. The lab network access server operates to diagnose problems associated with the customer modem device and includes a lab modem device. Upon the customer modem device failing to successfully communicate with the end-user modem device, the lab modem device receives a succeeding call from the end-user modem device using a pass-through mode of tunneling, through the packet switch network, and terminates the succeeding call thereby allowing diagnosis and debugging of the failure associated with the customer modem device to be performed at the location of the lab network access server. In a modem wholesale scenario, the same setup is used as a service to terminate modem calls in a remote location when a customer only has voice-over-IP capabilities.

10 Claims, 3 Drawing Sheets

MODEM PASS THROUGH FOR REMOTE TESTING

CROSS REFERENCE TO RELATED PATENT APPLICATIONS

This application is a continuation of our prior U.S. patent application Ser. No. 09/472,634, entitled "Modem Pass Through For Remote Testing", filed on Dec. 27, 1999 now U.S. Pat. No. 6,654,348, the co-inventors of which are Jerry Dwight Doty II and Luis Alexandre Viriato.

BACKGROUND OF THE INVENTION

1. Field of the Invention

The present invention relates generally to detecting problems arising from the use of a modem device that is positioned in a remote location (field modem debugging) and particularly to increasing the speed of such modem debugging. Additionally, the present invention can be used to support a service for offering remote wholesale modems through a voice-over-Internet Protocol (VoIP) carrier form the end-user to the wholesale modem banks.

2. Description of the Prior Art

In modern communication systems, information is transmitted from a point of origin to a destination point often through packet networks such as an Internet Protocol (IP), frame relay or Asynchronous Transfer Mode (ATM) networks. The point of origin and the destination point each may be any number of devices such as a Plain Old Telephone System (POTS), a fax machine, modem attached to a personal computer (PC) and the like. The information emanating from any one of such devices may be initiated in one country and received at another.

As an example, when a phone call is initiated from a telephone unit in Germany, in order for it to be transmitted over an IP network, which would either be the Internet or any other propriety IP network, it is forwarded to a local public switching telephone network (PSTN) in Germany. The telephone call is forwarded from the PSTN to a local network access server (NAS) in the form of compressed digital signals. Inside of the NAS, a Digital Signal Processor (DSP) device receives the voice calls from the PSTN in the form of digitized voice signals or pulse code modulation (PCM) samples, as defined by an industry standard, the ITU-T G.711.

Inside of the NAS, the voice signals are packetized (voice samples) into Real-time Transport Protocol (RTP) packets and sent over the IP network. RTP provides end-to-end network transport functions for applications that transmit real-time data, such as audio and video. The information in the form of RTP packets is transmitted from the IP network to a local NAS in the U.S. wherein the packets are reassembled into voice signals. The DSP inside of the NAS in the U.S. then transmits the voice signals to a local PSTN. Finally, the latter forwards the voice calls to the destination phone unit in the U.S.

To the end users at the point of origin and the destination point, the above mode of transmitting phone calls, also known as the IP phone or VoIP, is indistinguishable from a regular phone call, which is transmitted over the PSTN network. The call is tunneled through the IP network in order to connect the two PSTNs. Accordingly, using the IP phone to establish connection between 2 communication devices is alternatively called tunneling.

There are two distinct ways in which tunneling can be accomplished between two people, one who is located in Germany and the other who is located in the U.S., when the originating and destination (or terminating) devices are modem devices. The first mode is referred to as "pass-through". In the pass-through mode of tunneling, the NAS in Germany recognizes an incoming modem signal from the local PSTN by detecting a modem tone. The NAS subsequently sends a message to the IP network alerting the latter that high priority information is about to be transmitted so that the IP network can provide quality of service. The voice signals are bundled together as RTP packets in the NAS and transmitted over the IP network to a local NAS in the U.S. The receiving NAS reassembles the RTP packets as voice signals and sends them over to a local PSTN, which in turn forwards them to their destination modem device.

In pass-through, the transmitting NAS sends the voice calls in the form of PCM samples in both directions simultaneously. In other words, the NAS establishes a full-duplex communication channel. The data rate of a PCM voice call is 64 kbits/sec when data is sent in one direction (half-duplex) and 128 kbits/sec when voice signals are sent in both directions at all times. In the latter case, data is constantly being transmitted over the IP network for every single application. This is a considerable amount of bandwidth for one application alone, which makes pass-through an expensive method of tunneling.

Alternatively, tunneling can be accomplished using a method known as demodulation/remodulation, or relay. In relay, the NAS in Germany converts the PCM bytes into a word representing the linear digital equivalent of the analog signal received by the modem. Thereafter, the converted digital signal is demodulated into data bits. The demodulated bits are then forwarded across the IP network to the destination NAS in the U.S. The latter remodulates the bits into voice samples, which are then transmitted to the destination point by sending them through the local PSTN. In relay, data is transmitted when the latter is available with a lower rate transmission than in pass-through because in relay only modem data is transmitted without the sampled modulated signals. In addition relay transmits data in the direction that data is available. The transmission of data is half or full duplex depending on whether the data is transmitted in one or both directions. In pass-through, however, modem signal data is transmitted in both directions at all times and at a maximum rate of 64 kbps regardless of whether there is any modem data to be transmitted or not because the modem signals must be continuously transmitted to keep the modems at both ends operational and synchronous.

The pass-through mode of tunneling is more time-sensitive to delays than relay since in the former case, raw data rather than demodulated bits is being transmitted. Additionally, in pass-through, the likelihood of data being adversely affected by packet loss, packet corruption and packet delay jitter is less than it is in relay mode. As an example, in IP phone, using pass-through transmission, the connection has to be such that voice samples are not delayed or lost during transmission. Accordingly, the demand for bandwidth during voice transmission is high. On the other hand, faxes are transmitted using relay in the form of modulated bits where it is more tolerable to wait for modulated bits to arrive as a fax page, which makes relay less sensitive to networks impairments such as time delays and packet loss than the pass-through mode of tunneling. This is the method of voice data transport.

There are several reasons for the failure of a modem to establish communication. The most common ones are related to firmware problems. Most common problems with modems, such as the modem 38, have been known to relate to the modem's software (or firmware) and, in particular, to the incompatibility of the software with the modem hardware in which the software is being employed. For instance, the version of the software in the server modem may be incompatible with the specific client modem in which it is used or it may be that the software is incompatible with or not robust enough for the environment in which the modem is located.

At the present time, problems with the server modem, at the point of origination, (commonly referred to as the customer's server modem) are investigated by dispatching diagnostic equipment to the site of the customer's NAS. The diagnostic equipment must be inserted in the data path within the customer's NAS in order to analyze the server modem's behavior and to particularly monitor negotiations between the user's client modem and the server modem located within the NAS at the destination point. The analyzing device samples data on the transmission lines which couple the PSTN on the originating side of the communication path with the customer's NAS. Generally such transmission lines are of either T1 or E1 type. Twenty-four channels of voice or modem channels are included in a T1 transmission line and 30 channels of voice or modem channels are included in an E1 transmission line.

However, there are limitations associated with dispatching equipment to the field. For example, if there are a large number of customers who are experiencing difficulties with their server modem connections at any one time there may not be a sufficient number of analyzing devices available. Moreover, the customer's NAS may be located in a physically remote location with respect to the diagnostic equipment and thus not be easily accessible to the engineers and/or technicians.

In light of the above, it is desirable to route and terminate the call in a location that maintains a rich debugging and instrumentation environment with appropriate probes and with the necessary capability to monitor the problem in real time.

SUMMARY OF THE INVENTION

Briefly, an embodiment of the present invention includes a lab network access server coupled to an end-user client modem device via a customer server modem device and through a packet switching network. The lab network access server is coupled to a customer access network server through the packet switching network using a VoIP connection. The customer access network server includes the customer server modem device. The customer server modem device is coupled to the end-user client modem device over a Public Switching Telephone Network (PSTN). The lab network access server operates to diagnose problems associated with the customer server modem device and includes a lab server modem device. The end-user client modem device attempts to establish a call with the customer server modem device but instead of terminating the call at the customer server modem device, the customer network access server forwards or tunnels the call to the lab server modem device using a tunneling method thereby terminating the call that was initiated by the end-user modem device at the lab network access server.

The foregoing and other objects, features and advantages of the present invention will be apparent from the following detailed description of the preferred embodiments which make reference to several figures of the drawing.

DETAILED DESCRIPTION OF THE EMBODIMENT(S)

The present invention employs voice-tunneling infrastructure for diagnosing problems associated with a modem in termination applications. Utilizations other than diagnosing problems may be had with the present invention in that modem termination may be used for applications other than diagnosis to save costs that would otherwise be incurred. For applications such as browsing the Internet, a modem call is terminated at the NAS and converted into IP packets.

Figure 1:
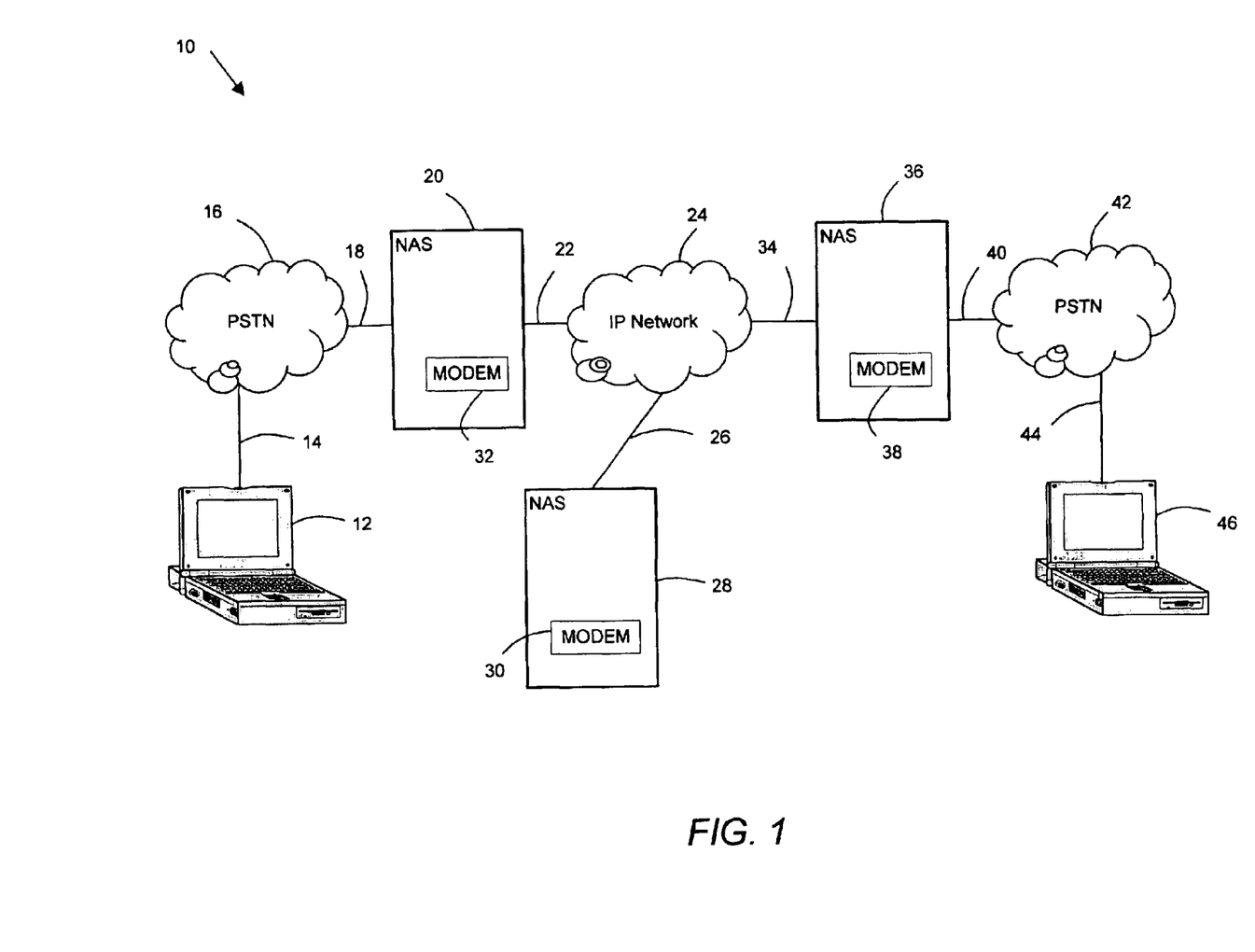
FIG. 1 shows a network communications system 10 employing modem termination through pass-through mode of tunneling in accordance with an embodiment of the present invention.

Referring now to FIG. 1, an embodiment of the present invention is shown to include a network communications system 10 between a point of origin and a destination point, each of which may be any number of devices such as telephone units, personal computers, modems, fax machines, etc. In FIG. 1, the communications system 10 is shown to include a point of origin 46 and a destination point 12, which are shown to be two personal computers (PCs). The communications system 10 is also shown to include the two PSTNs 16 and 42 and three network access servers (NASs) 20, 28 and 36 as well as the packet network 24, which may be IP, frame relay or ATM network. In the embodiment of the present invention, as shown in FIG. 1, the network 24 is shown to be an IP network, which may be the Internet or any other type of IP network known to those skilled in the field. Each of the NAS devices is shown to include a modem such that modems 32, 30 and 38 are located inside of the network access servers 20, 28 and 36, respectively.

According to one embodiment of the present invention, as exemplified by the communications system 10, PC 46 communicates either with the PC 12 or with the NAS 28. In order to establish either of these connections, PC 46 is coupled to the PSTN 42 through a transmission line 44. The PSTN 42 is coupled to the NAS 36 through the transmission line 40, which in one embodiment of the present invention is a high speed transmission line such as a T1/E1 line or any telephone company (Telco) TDM transport line such as optical-OCx, T3/E3 and the like. Network access server 36 is coupled to the IP network 24 through the transmission line 34, which in one embodiment of the present invention is an Ethernet connection.

The network access servers (NAS) 20 and 28 are in communication with the IP network 24 through the communication lines 22 and 26, respectively. Network access server 20 is in communication with the PSTN 16 via the transmission line 18 and the PSTN 16 is in communication with the PC 12 through the transmission line 14.

When the two personal computers, 46 and 12, are communicating with each other, the IP network 24 provides a bridge between them. Such a mode of communication between the two PCs is commonly referred to as tunneling wherein the connection between the two end points is established by passing the information through the IP network 24 rather than terminating the call at a point in the IP network 24 (an example of when the call in the IP network is terminated is when a search is performed on the Internet). The presence of the IP network 24 and the two network access servers 20 and 36 is indistinguishable to the PCs 46 and 12 from the case where the two PSTNs 42 and 16 are directly communicating with each other.

While not shown in FIG. 1, each of the PCs 46 and 12 is equipped with a modem for transmission and reception of the information. Alternatively, the two personal computers 46 and 12 may be replaced with two telephone units for transmission of information in the form of voice calls in analog format.

According to another embodiment of the present invention, the PC 46 communicates with the NAS 28. In such a case, the information originating at the PC 46 is transmitted to the NAS 28 by tunneling through the IP network 24. Once the information in the form of voice signals arrives at the NAS 28, it is terminated at the modem 30 inside the NAS 28 rather than at a PC or a telephone unit.

Referring still to FIG. 1, information in the form of voice signals is transmitted from the PSTN 42 to the NAS 36 and is then forwarded to a Telco network, such as the PSTN 16 through the IP network 24. In this manner, the IP network 24 provides a bridge between the two PSTNs 42 and 16. The voice information is then transmitted from the PSTN 16 to its destination point, which in FIG. 1 is shown to be the PC 12.

However, when the information is forwarded through the IP network 24 to the modem 30, the voice call is no longer terminated at a PC or a phone unit. Rather, it is terminated inside the modem 30. Accordingly, the mode of transmission from the PC 46 to the NAS 28 is referred to as modem termination.

It should be noted that information is forwarded through the IP network 24 to the modem 30 by specifying the modem's IP address.

There are two ways of tunneling when 2 modems are communicating with each other as in FIG. 1. In the first mode, known as pass-through, the NAS 36 identifies the incoming voice signals as modem signals being that these signals originated in a modem (not shown) residing inside of the PC 46. The NAS 36 then sends a message to devices included within the IP network 24 alerting the latter of high priority information that is about to be transmitted. This provides an opportunity for devices within the IP network 24 to provide quality of service for transmission of the high priority information.

Once the voice information reaching the NAS 36 is detected as modem calls, two additional functions are performed inside of the NAS 36. First, a group of signals arriving at the same time are bundled together and turned into RTP packets and transmitted over the IP network 24 either to the NAS 20 or to the NAS 28 as dictated by the destination address of the voice signals. If the RTP packets arrive at NAS 20, the latter reassembles the RTP packets into voice signals and transmits them to the PSTN 16 and the PSTN 16 forwards the same onto the destination point PC 12. However, if the destination of the RTP packets is NAS 28, upon arrival, NAS 28 reassembles the RTP packets into voice samples and rather than sending them to another PSTN, it turns them over to the modem 30. Thus, the call is terminated using the pass-through mode of tunneling according to one embodiment of the present invention as depicted in FIG. 1.

The second method of tunneling is referred to as modulation/demodulation or relay wherein modem 38, upon receiving voice signals, demodulates the same into bits (or partially terminates the voice signals). The network access server 36 subsequently forwards the demodulated bits over the IP network 24 either to the NAS 20 where they are remodulated into voice signals by the modem 32 or to the NAS 28 where they are remodulated into voice signals by the modem 30.

One of the advantages of the relay mode of tunneling versus the pass-through mode of tunneling is that the former transmits data when data is available and at a lower rate since in relay only modem data is transmitted without the sampled modulated signals. In addition, relay transmits data in the direction that data is available. The transmission of data is half or fill duplex depending on whether the data is transmitted in one or both direction. In pass-through, however, modem signal data is transmitted in both directions at all times and at a maximum rate of 64 kbps regardless of whether there is any modem data to be transmitted or not because the modem signals must be continuously transmitted to keep the modems at both ends operational and synchronous.

Communication between the end points 46 and 12 is disrupted when either of the NAS 36 or 20 fails to establish a connection. Experience has shown that if the problem lies within the originating NAS 36, it is likely due to the modem 38 failing to establish a connection. Most common problems with modems, such as the modem 38, have been known to relate to the modem's software (or firmware) and, in particular, to the incompatibility of the software with the modem hardware in which the software is being employed. Additionally, the modem software may be incompatible with the environment in which the modem is located.

When a modem at the point of origination, i.e. the customer's modem, is suspected of malfunctioning, the prior art method of investigation is to dispatch diagnostic equipment to the physical site of the modem, which is generally located inside of the customer's NAS. In FIG. 1, the customer's modem 38 is shown to be located inside of the NAS 36. The diagnostic equipment is a PCM signal capture and analysis device designed to monitor negotiations between the customer's modem 38 and the destination modem 32. The diagnostic device monitors voice samples sent over the transmission line 40. However, there are obvious limitations associated with dispatching equipment to the field. For instance, the customer's NAS may be located in a physically remote region, which may not be easily accessible. Moreover, in the case where there are a large number of customers experiencing problems with their modem connection at any give time, there may not be an adequate number of diagnostic devices available.

According to one embodiment of the present invention, as shown in FIG. 1, when connection between the PC 46 and the customer's modem 38 cannot be established, rather than terminating the incoming call at the customer's modem 38, the call is routed through the IP network 24 and terminated at modem 30 located in the NAS 28. If the NAS 28 is located in a diagnostic laboratory, where facilities accommodate for a rich debugging and instrumentation environment, potential problems can be monitored in real-time and relevant diagnostic tests can be readily performed to detect and to potentially resolve the problem. In addition, the need to dispatch an engineer and/or a technician with a diagnostic device to the customer's NAS 36 is eliminated or reduced. Furthermore, installing the diagnostic equipment in the customer's NAS causes an interruption in service for the customer whereas using the method of the present invention avoids any disruption to the customer of the normal operation of the network. In the case of the present invention, the call that originated at the PC 46 can be routed through the IP network 24 and is terminated at modem 30.

While not shown in FIG. 1, the NAS 28 alternatively includes two modem devices, a first modem device for performing processing of signals received from the IP network 24 to conform the same to voice signals and a second modem device, coupled to the first modem device, for receiving TDM voice signals and operating as a termination point.

Additionally, the network communications system 10 may be employed for modem "wholesaling". That is, rather than performing diagnostics or debugging functions, the NAS 28 may serve to terminate modem calls in a location that is remote to the NAS 36 for a customer who has only voice-over-IP capabilities. In this manner, a secondary use of the present invention is to provide remote modem wholesale service when the customer NAS only supports VoIP and the end-user is trying to connect with a modem.

Figure 2:
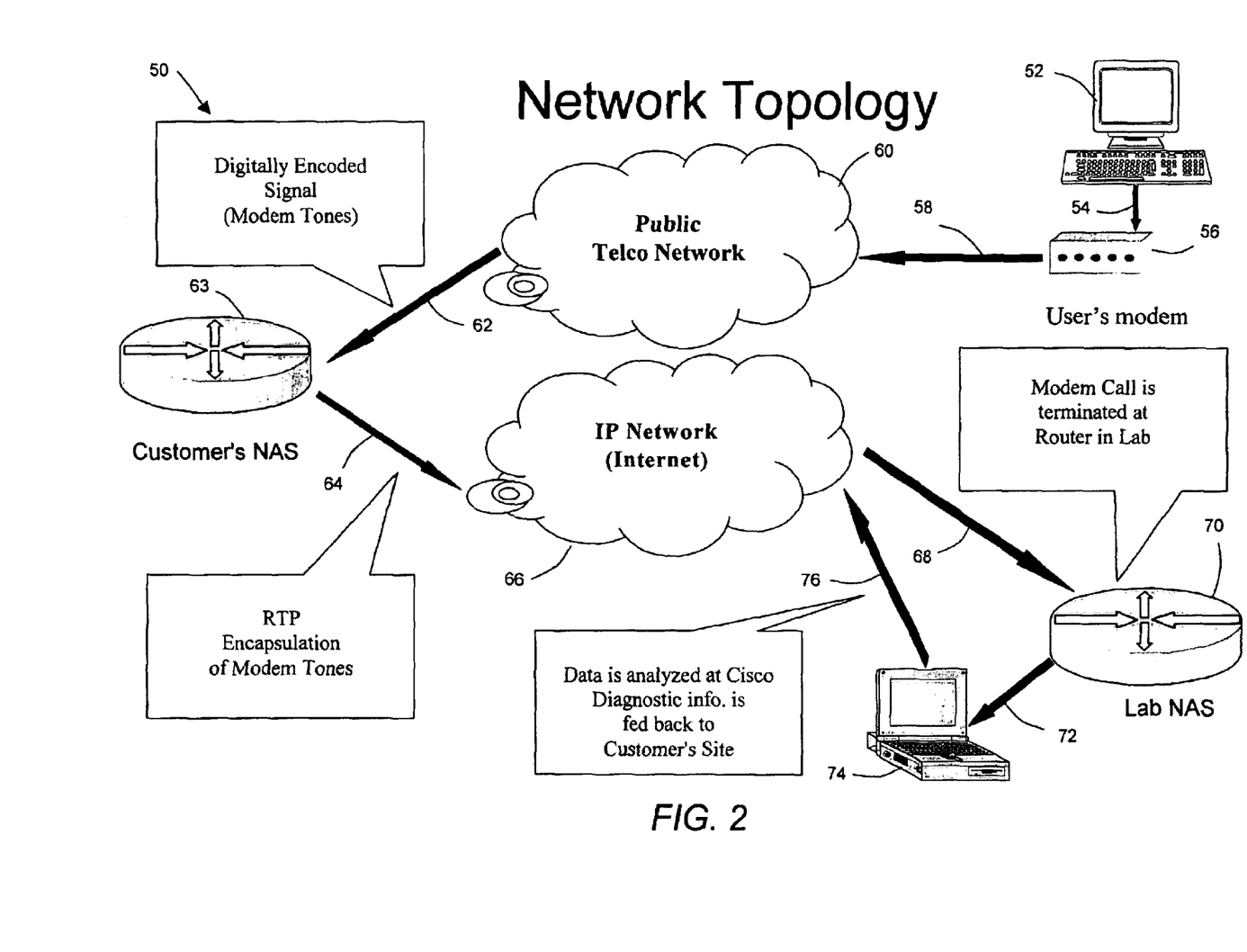
FIG. 2 shows a network topology for a communications system 50 in accordance with an embodiment of the present invention.

FIG. 2 shows a network topology for a communications system 50 for illustrating the details of modem termination in accordance with an embodiment of the present invention. In communications system 50, an end user working at the PC terminal 52 transmits information through the modem 56 in the form of telephone calls. The arrow 54 indicates the connection between the PC 52 and the modem 56. The phone call is terminated in a modem (not shown) within the NAS 70, which is positioned locally with respect to the party monitoring or diagnosing problems, such as in a diagnostic lab.

The communications system 50 includes a user's PC 52, a user's modem 56, a public Telco network 60, the latter otherwise known as a PSTN, a customer's NAS 63, an IP network 66, a lab NAS 70 and a test workstation 74. The user's modem 56 is connected to the PSTN 60 through the communication line 58 and the PSTN 60 is coupled to the customer's NAS 63 through the line 62, which in one embodiment of the present invention is a T1/E1 line or any Telco Time Division Multiplexed (TDM) transport line such as an optical-OCx, T3/E3 and the like. The customer's NAS 63 is coupled to the IP network 66 through the Ethernet connection 64 and the IP network 66 communicates with the lab NAS 70 through the Ethernet connection 68. The lab NAS 70 is connected to the workstation 74 through the line 72 and the workstation 74 is coupled to the IP network 66 through the line 76.

The information originating at the user's PC 52 is converted from a digital format to an analog format by the user's modem 56 and transmitted to the PSTN 60. Inside of the PSTN 60, the analog signals are digitally encoded by a subscriber line interference card (SLIC) located at the "edge" of the PSTN where 60 and 58 meet and thereafter transmitted to the customer's NAS 63. In this respect, the modem that is located inside of the customer's NAS 63 recognizes them as modem tones. Thereafter, the voice signals are transmitted over the IP network 66 using the two modes of tunneling described hereinabove.

If the modem fails to connect with the NAS 63, the call ends. Then, the NAS 63 has to be configured to treat the next call as a VoIP call and tunnel the voice signals to the NAS 70. The customer's NAS 63 converts the voice signals, being in the form of PCM samples, into RTP packets and transmits the same to the IP network 66, as shown in FIG. 2. In this case however, the voice signals are processed through the hardware that is located within the modem in the customer's NAS 63. This is done without the modem software code being executed and the modem, in the customer's NAS 63, operates as a straight pipe for passing the voice signals therethrough, the modem in the customer's NAS 63 having buffers for handling the latency and delays through the network. The IP network 66 subsequently forwards the information packets to the modem that is located inside of the lab NAS 70 at which point the call is terminated and the information is analyzed in order to debug the modem problem in real-time. This is particularly useful because at the lab, the test workstation 74 having appropriate probes for test purposes is available thereby rendering troubleshooting/debugging an easier task than to have to do the same in the field where the problematic modem is located. Furthermore, debugging takes place in real-time resulting in a more accurate representation of the nature of the problem that is being diagnosed.

Moreover, in the lab as much recording and logging as is necessary can be performed thereby resulting in greater advantage over dispatching equipment as is done in the prior art, which has obvious limitations, some of which are enumerated hereinabove.

There are a number of parameters such as a local carrier loop, carrier equipment, and the customer's local loop that can cause a modem to fail. Local carrier loop is the circuit 50, which carries analog signals from the modem 56 to the Telco network 60. Malfunctions are prevalent with respect to this connection due to a lack of a controlled environment. For example, typically, the connection from the modem 56 to the Telco network 60 is a telephone cable or an extension in a user's home. Carrier equipment is the circuit switch and the subscriber line interface card (SLIC) at the edge of the Telco network 60, which connects to the local carrier loop 58. Since the carrier equipment carries analog information, it is more susceptible to problems such as noise. Customers' local loop is the same as the local carrier loop when it is connected to a local PSTN network, which may be owned privately and not under the control of an authority.

When the relevant parameters are identified and debugging is completed at the test station 74, appropriate action can be taken on the customer server modem in the NAS 63, the modem in the PC 52 or the PSTN 60. In this manner, by terminating the call at the lab modem, the equipment in the lab is placed at the customer's site in a virtual sense for the purposes of debugging and diagnostics.

Figure 3:
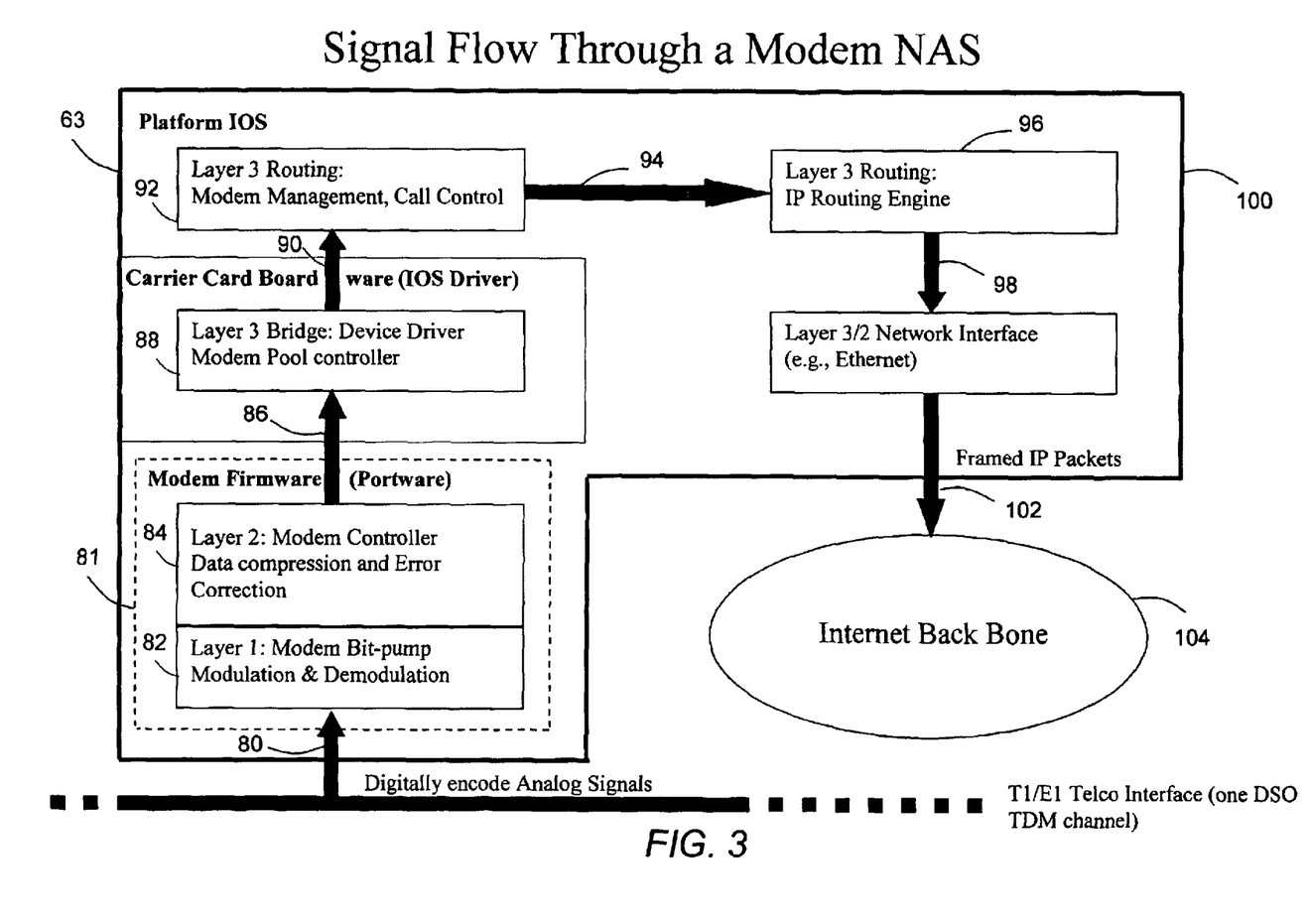
FIG. 3 shows a signal flow chart in a network access server device.

FIG. 3 illustrates a flow chart of a voice signal through the customer's NAS 63. The voice signals, in the form of digitally encoded analog signals, arrive at the customer's NAS 63 via the transmission line 80. The signal goes through various layers in the NAS 63, as depicted in FIG. 3.

In order to terminate the voice call at the lab NAS 70, as shown in FIG. 2, the software residing in the NAS 70 need be modified. The software in a typical NAS includes an internetworking operating system (IOS) and the modem firmware. The IOS is the operating system for the network access servers in much the same way as Windows 98 is an operating system for a PC.

The modem firmware module 81 as shown in FIG. 3 receives the digitally encoded analog signals. The modem firmware module 81 consists of multiple layers. In layer one, 82, modulation/demodulation of the voice signals is performed whereby the voice signals are turned into bits and vice-versa. In layer two, 84, of the modem firmware module 81, compression and decompression of the data as well as error correction take place. The voice signals are transmitted to the layer three Bridge 88, as indicated by the arrow 86 in FIG. 3. At step 88, the data are encapsulated into well-defined IP packets and transmitted to the layer three routing 92 as indicated by the arrow 90.

At step 92, it is determined through one of the input/output ports the IP packets are routed through to their final destinations. This is done based upon the IP packets' designated IP address.

The IP packets are now ready to be routed to the IP network 66. For this purpose, they are transmitted to the layer three routing 96 as indicated by the arrow 94 where an IP routing engine sends them, via the layer network interface 100, otherwise known as Ethernet, to the Internet Back Bone 104. The arrow 102 in FIG. 3 indicates the latter transmission.

The customer's NAS 63 (shown in FIG. 2) includes a processor (not shown), or computer medium, some type of storage area and a computer readable medium, for storing the software/firmware described in FIG. 3. The processor executes code from the computer readable medium for effectuating the functions outlined in FIG. 3.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A network communication system for communicating information between a point of origin and a point of destination using a pass-through mode of tunneling through a packet switching network comprising:

a first network access server coupled to the point of destination for communicating therebetween through a public switching telephone network and responsive to information from a second network access server originating at a point of origin through a public switching telephone network, said first network access server and said second network access server communicating therebetween through a packet switching network; and a lab network access server coupled to the first network server through the packet switching network and to the second network access server through the packet switching network, upon the point of origin establishing a call to the point of destination, through the second network access server and upon the second network access server failing to successfully communicate with the first network access server, said lab network access server responsive to a succeeding call from the second network access server using a pass-through mode of tunneling, through the packet switching network and terminating the succeeding call thereby allowing diagnosis and debugging of the failure associated with the second network access server at the location of the lab network access server.

2. A network communication system, as recited in claim 1, wherein said first network access server includes a first modem device.

3. A network communication system, as recited in claim 1, wherein said second network access server includes a second modem device.

4. A network communication system, as recited in claim 1, wherein said first network access server includes a first modem device.

5. A network communication system, as recited in claim 1, wherein said lab network access server includes a first lab network access server modem for terminating the succeeding call.

6. A network communication system, as recited in claim 5, wherein said network access server includes a second lab network access server modem for processing the information received through the packet switching network.

7. In a packet switching network environment employing a customer network access server, including a customer modem, coupled to a lab network access server, through a packet switching network, and to a first network access server, through a packet switching network, said lab network access being remotely located to the customer network access server, said packet switching network environment causing communications between a point of origin and a point of destination, a method of diagnosing problems associated with the customer modem comprising:

establishing a call from the point of origin to the point of destination, through the customer network access server and the first network access server;

failing to successfully communicate with the first network access server;

establishing a succeeding call from the customer network access server to the lab network access server using a pass-through mode of tunneling and through the packet switching network;

terminating the succeeding call; and allowing for diagnosis and debugging of the failure associated with the customer network access server at the location of the lab network access server.

8. In a packet switching network environment employing a customer network access server, including a customer modem, coupled to a lab network access server, through a packet switching network, and to a first network access server, through a packet switching network, said lab network access being remotely located to the customer network access server, said packet switching network environment causing communications between a point of origin and a point of destination, a method of diagnosing problems associated with the customer modem comprising:

establishing a call from the point of origin to the point of destination, through the customer network access server and the first network access server;

failing to successfully communicate with the first network access server;

establishing a succeeding call, including voice signals, from the customer network access server to the lab network access server using a relay mode of tunneling and through the packet switching network wherein the voice signals are demodulated;

terminating the succeeding call; and allowing for diagnosis and debugging of the failure associated with the customer network access server at the location of the lab network access server.

9. A computer readable medium having stored therein computer readable program code comprising instructions for performing the following steps:

providing a lab network access server coupled to a customer network access server, including a customer modem, through a packet switching network, said lab network access server and said customer network access server further coupled to a first network access server, through the packet switching network and said lab network access being remotely located to the customer network access server, said customer network access server for facilitating information between a point of origin and a point of destination;

establishing a call from the point of origin to the point of destination, through the customer network access server and the first network access server;

failing to successfully communicate with the first network access server;

establishing a succeeding call from the customer network access server to the lab network access server using a pass-through mode of tunneling and through the packet switching network;

terminating the succeeding call; and allowing for diagnosis and debugging of the failure associated with the customer network access server at the location of the lab network access server.

10. A computer readable medium having stored therein computer readable program code comprising instructions for performing the following steps:

providing a lab network access server coupled to a custom network access server, including a customer modem, through a packet switching network, said lab network access server and said customer network access server further coupled to a first network access server, through the packet switching network and said lab network access being remotely located to the customer network access server, said customer network access server for facilitating information between a point of origin and a point of destination;

establishing a call from the point of origin to the point of destination, through the customer network access server and the first network access server;

failing to successfully communicate with the first network access server;

establishing a succeeding call from the customer network access server to the lab network access server using a relay mode of tunneling and through the packet switching network;

terminating the succeeding call; and allowing for diagnosis and debugging of the failure associated with the customer network access server at the location of the lab network access server.

* * * * *

UNITED STATES PATENT AND TRADEMARK OFFICE
CERTIFICATE OF CORRECTION

PATENT NO. : 6,898,186 B2 Page 1 of 1
APPLICATION NO. : 10/671097
DATED : May 24, 2005
INVENTOR(S) : Doty, II et al.

It is certified that error appears in the above-identified patent and that said Letters Patent is hereby corrected as shown below:

Column 12, line 20, please replace "to a custom" with --to a customer--

Signed and Sealed this

Twelfth Day of December, 2006

JON W. DUDAS
*Director of the United States Patent and Trademark Office*